United States Patent
Zigliotto

[11] Patent Number: 5,965,045
[45] Date of Patent: *Oct. 12, 1999

[54] WELDING TORCH WITH A BALL JOINT CABLE ADAPTOR

[75] Inventor: Giuseppe Zigliotto, Longare, Italy

[73] Assignee: Trafimet S.P.A., Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/446,940

[22] Filed: May 11, 1995

[51] Int. Cl.$^6$ ...................................................... B23K 9/00
[52] U.S. Cl. .................. 219/137.31; 219/137.63
[58] Field of Search .................... 219/137.31, 137.63, 219/137.9

[56] References Cited

U.S. PATENT DOCUMENTS 1,508,713  9/1924  Noble ................................. 219/137.31
5,132,513  7/1992  Ingwersen et al. ................ 219/137.31

*Primary Examiner*—Clifford C. Shaw
*Attorney, Agent, or Firm*—Vorys Sater Seymour & Pease LLP

[57] ABSTRACT

A welding torch comprises a handle having, at the back, a cable adaptor being formed by a ball joint which is integral with a cable support wherein a feeder is inserted. Better handleability is achieved.

5 Claims, 2 Drawing Sheets

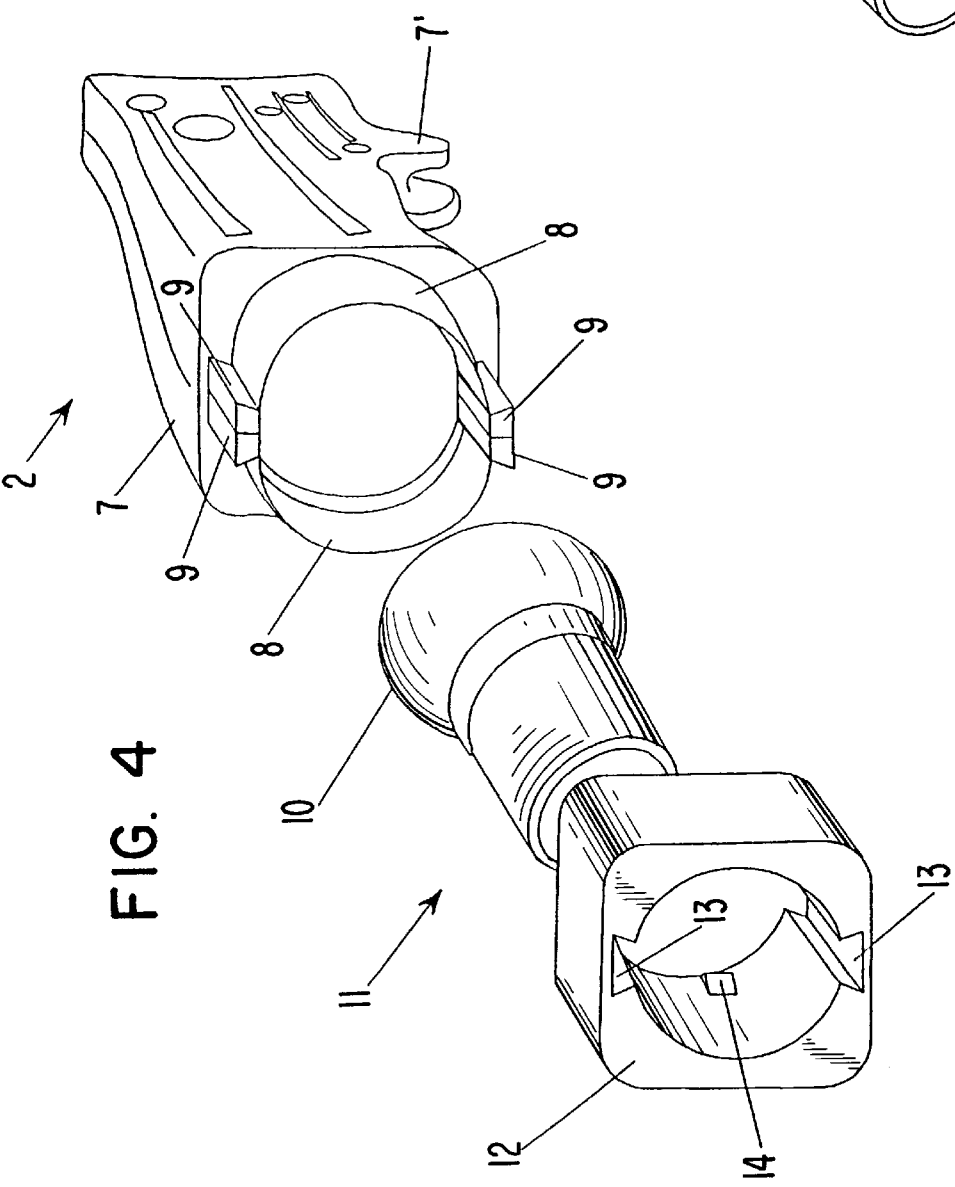

WELDING TORCH WITH A BALL JOINT CABLE ADAPTOR

BACKGROUND OF THE INVENTION

The invention relates to the field of welding, particularly the use of welding torches. In welding torches the feeder is connected to the handle at the back of the torch. This cable, provided with the appropriate covering, generally of rubber or the like, has a diameter of a few centimeters and, as a consequence, it is quite heavy and little flexible. The inherent stiffness of the cable which, moreover, is quite heavy, makes it difficult and uncomfortable to manipulate the torch, especially when the position is which welding has to be performed compels to place the torch with a certain inclination.

Therefore, in the field there is the need to have means allowing to obviate this drawback by facilitating the manipulation of the torch.

SUMMARY OF THE INVENTION

The invention overcoming these difficulties and providing other advantages provides a welding torch having a ball joint cable adaptor allowing the torch to be differently angled relative to the axis of the cable, thus making it much easier for the operator to manipulate it.

In particular, the torch of the invention is provided at its back, where the cable adaptor lies, with a support wherein the cable is inserted and having, at one end, a ball joint by which it is connected to the handle of the torch. The ball joint is clamped into position by simply snap-fitting a washer in, thus avoiding the use of screws or the like for the assembly. Consequently, the torch of the invention is characterized by the particular configuration of its components, which makes it easier to be used than the known devices.

To this purpose, the present invention provides a torch having a handle with a hinged adaptor and, in particular, a torch wherein the back of the handle comprises a ball joint for connecting the cable, said ball joint allowing to place the torch with a certain inclination with respect to the axis of the cable and to rotate it around this axis. As a consequence, manipulation is made easier, thus being much more practical to use these devices.

BRIEF DESCRIPTION OF THE DRAWINGS

FIG. 4 illustrates perspective exploded view of the cable adaptor in a torch according to the invention.

FIG. 5 illustrates a perspective view of the fitted-up cable adaptor.

DETAILED DESCRIPTION OF THE DRAWINGS

Figure 3:
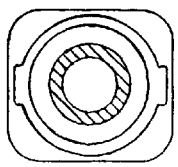
FIG. 3 illustrates a sectional view taken along the line A—A of FIG. 2.
Figure 2:
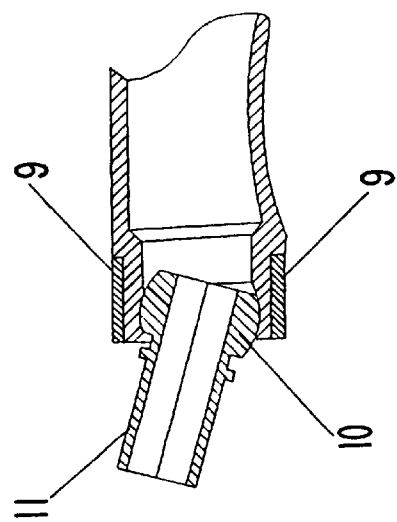
FIG. 2 illustrates a sectional view of the handle of the torch near the ball joint cable adaptor.
Figure 1:
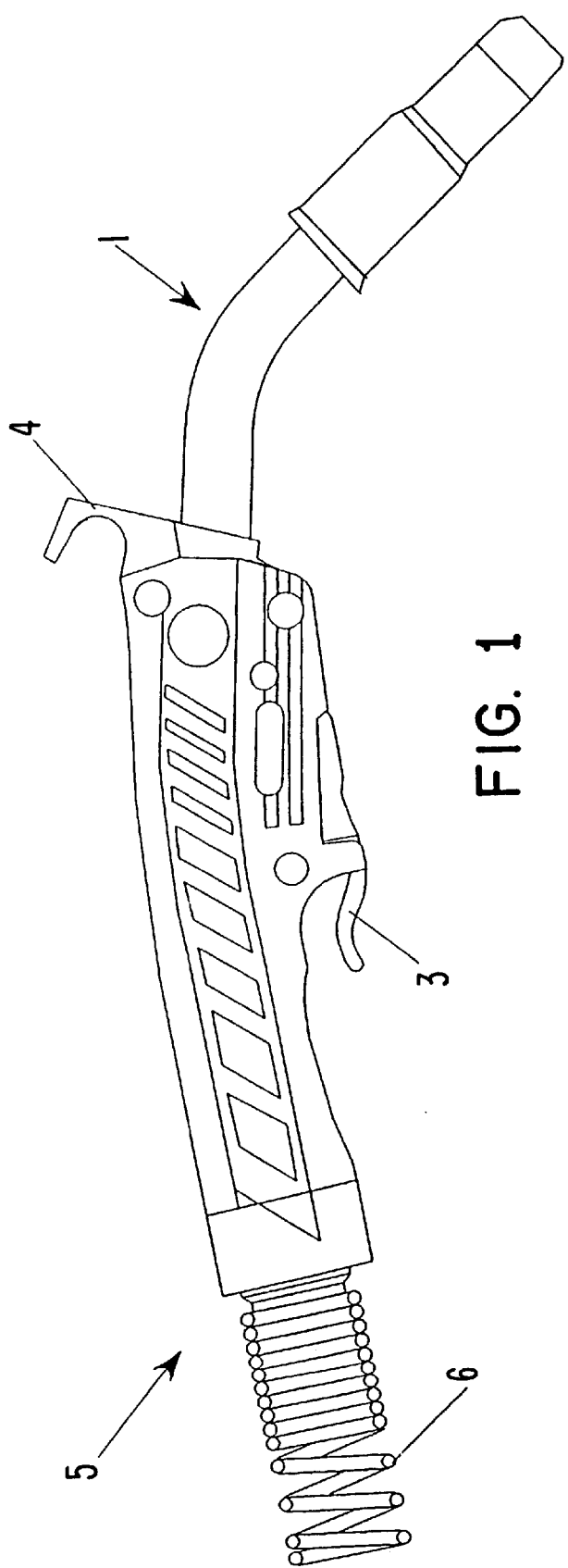
FIG. 1 illustrates a view of the torch of the invention.

With reference to FIG. 1, the torch of the invention, indicated by reference number 1, includes a handle 2, provided with a start trigger assembly 3 and a hooking device 4 or the like and having at its back a cable adaptor, indicated as a whole by reference number 5. Reference number 6 in FIG. 1 designates a protection spring being wound round the end portion of the cable near the connector to the torch.

With reference to FIG. 4, the handle consists of two half-shells 7 and 7' ending, at the back, with as many semiannular walls 8 having, at their ends, shaped teeth 9 and 9'. Said teeth 9–9' are shaped so as to form, two by two, as many dovetail guides. On the other hand, walls 8 are inwardly shaped to receive the rounded head 10 of a cable support 11, thus making a ball joint. On said cable support a collar 12 is fitted having a pair of dovetail grooves 13 to be inserted onto teeth 9–9'. Collar 12 snap-fits on walls 8 and is kept in position for resiliently engaging some teeth 14, only one of which is shown in FIG. 4, said teeth 14 engaging corresponding seats provided in walls 8.

As can be easily understood, this construction is very practical, since the various components can be easily manufactured, for example by molding, and they permit to assemble the torch without having to use screws or the like, thus making the assembling procedure cheaper and quicker.

Once the front of the two half-shells have been joined, for example by fitting them one into the other, it is sufficient to close their back by tightening walls 8 around the spherical component 10, and secure them into position by simply snap-fitting collar 12.

The ball joint allows cable support 11 to have a certain inclination, for example of about more or less 15°, relative to the handle and it also permits to rotate said handle through 360° around its axis with respect to the cable support itself, thus making it possible to place easily the torch with the most convenient inclination.

Obviously, the overall size, as well as the materials, may change according to use requirements.

The foregoing description of the welding torch assembly of the invention is illustrative, and variations on certain aspects of the inventive system will occur to persons skilled in the art. The scope of the invention is accordingly intended to be limited only by the following claims.

What is claimed is:

1. A welding torch assembly comprising:
   a handle having a rear end and a cable adaptor pivotably and rotatably attached to said rear end.

2. A welding torch according to claim 1 wherein said adaptor comprises a ball joint integral with a cable support adapted to receive a feeder inserted therein.

3. A welding torch assembly comprising:
   a cable;
   a handle having a rear end;
   a cable adaptor pivotably and rotatably attached to said rear end of said handle;
   said cable adaptor comprising a ball member integral with a cable support adapted to receive said cable therein;
   said handle comprising first and second half-shells,
   said first half shell having at its rear end a first projecting member and said second half-shell having at its rear end a second projecting member, each of said first and second projecting members having a generally concave wall;
   said concave walls of said first and second projecting members cooperating with each other to form a cavity encompassing said ball member.

4. A welding torch according to claim 3, wherein said projections are provided with cooperating dovetail guides, and said welding torch assembly additionally comprises a collar engaging said dovetail guides and surrounding said projections, whereby said concave walls of said projections are secured around said ball member.

5. A welding torch assembly according to claim 4 wherein said collar is provided with elastically deformable teeth and said projections are provided with recesses, said elastically deformable teeth mating with said recesses whereby said collar is locked in position around said projections.

* * * * *